United States Patent [19]

Feder

[11] 4,201,059

[45] May 6, 1980

[54] HYBRID ENERGY CONVERTOR

[76] Inventor: Hubert C. Feder, 1517 Roosevelt Ave., Alamogordo, N. Mex. 88310

[21] Appl. No.: 845,781

[22] Filed: Oct. 26, 1977

[51] Int. Cl.² ............................................. F03G 3/04
[52] U.S. Cl. ...................... 60/639; 60/398; 185/33
[58] Field of Search ............... 60/398, 507, 639; 290/43; 185/4, 6, 7, 27, 32, 33

[56] References Cited

U.S. PATENT DOCUMENTS

| 512,352 | 1/1894 | Zwiebel | 60/398 X |
|---|---|---|---|
| 970,796 | 9/1910 | Clark | 60/398 |
| 1,227,201 | 5/1917 | Rountree | 60/507 X |
| 1,276,112 | 8/1918 | Reed | 60/507 |
| 1,304,238 | 5/1919 | Wright | 60/507 |

FOREIGN PATENT DOCUMENTS 298091 6/1932 Italy ................................ 185/27

Primary Examiner—Allen M. Ostrager
Assistant Examiner—Stephen F. Husar
Attorney, Agent, or Firm—Clarence A. O'Brien; Harvey B. Jacobson

[57] ABSTRACT

An arrangement of constructual elements used for the conversion of fluctuating natural energy and generation of constant rotary speed of a power-producing machine or motor, electric or otherwise, by way of free-falling masses in the place of commonly used regulators or governors. With this arrangement, the invention realizes a transmission for which, in contrast to known transmissions, the output speed is constant regardless of the input speed so long as the input torque is equal to or greater than the output torque.

7 Claims, 3 Drawing Figures

HYBRID ENERGY CONVERTOR

BACKGROUND OF THE INVENTION

1. Field of the Invention

This invention relates generally to energy conversion, and particularly to a transmission for converting fluctuating natural energy into rotary output of generally constant angular velocity.

2. Description of the Prior Art

Whatever primary resources are used in supplying future electrical energy needs, a back-up system based on minor natural resources with or without access to a national or municipal grid could be a decisive factor in case of local or widespread energy emergencies. With all technically feasible applications of minor natural resources accounting only for a small percentage of total energy needs, it is readily understood that these resources such as water, wind, and sun, taken individually, fail to have any appreciably economic significance so long as they are subject to widely different technologies. Therefore, the question addressed is concerned with simplifying the technology to the effect that any one or all minor natural energy resources can be exploited by a common concept in order to generate electrical or other suitable energy. To this end, the disclosed invention is used as an interface system allowing for a transitory change of both form and substance of an available energy mode. It is this property of transitory energy mode that designates such systems as hybrid, and indicates their preferred application as minielectric energy installations. To be sure, distinction is made between a hybrid energy converter with reference to its functional property as a transmission of constant output speed, and hybrid electric installations with their combinations of different mini-energy resources, such as wind, water, and sun.

The advantage of the disclosed invention not only rests in its inherent independence of cyclic or arbitrarily occurring fluctuations of hydrodynamic, aerodynamic, or thermodynamic prime movers, but also with its ability of storing energy. It is these two functions, namely constant output speed and energy storage, that have attracted the attention of other inventors. U.S. Pat. No. 3,983,704, issued Oct. 5, 1976 to L. C. McFarland, is concerned primarily with a solar heat converter characterized by constructual elements of distinct dissimilarity from those of the present invention. The same is true of U.S. Pat. No. 3,974,394, issued Aug. 10, 1976 to W. Bailey, which is primarily concerned with energy storage, and lacks both intentional and constructual similarities in comparison with the disclosed invention. The inventions disclosed in the U.S. Pat. Nos.: 1,389,428, issued Aug. 30, 1921 to G. Gartling; 1,932,497, issued Oct. 31, 1933 to L. H. Wellensiek; and 2,478,051, issued Aug. 2, 1949 to C. H. Nordell, show some similarity with an invention disclosed in U.S. Pat. No. 659,660, issued Oct. 16, 1900 to M. Gehre, in regard to functional details of energy transmission and, therefore, can be discussed together in comparison with the disclosed invention. Characteristically, for all the compared inventions, the energy carrying elements are supported by a guide system which allows for their cyclic up and down movement by which energy is stored during their movement in one direction and released in their movement in the opposite direction. In the case of the device disclosed in U.S. Pat. No. 659,660, chain-driven weights, in their free-fall movement, transfer their stored, potential energy back to the same chain, thus driving an electrical generator by way of their gained kinetic energy. In the present invention, the cyclic potential/kinetic energy exchange takes a different course insofar as the free-falling masses are concerned, with those masses also being fed back to the chain or otherwise supported recycling carrier but only after their gained free-fall kinetic energy was transferred directly to the mover of an electrical generator, which generator is not in a mechanically fixed connection with respect to the recycling conveyor of the falling masses at any time. This is in contrast to the device disclosed in U.S. Pat. No. 659,660, which is distinguished from the present invention by its periodic energy generation in contrast with the continuous energy generation accomplished by the present invention. It is due to the latter design that constructual simplicity and operational cost-effectiveness are increased.

SUMMARY OF THE INVENTION

It is an object of the present invention to provide for an energy transmission having the inherent property, without the need for control systems related to the prime mover, of converting variable, rotary input speed of the driving elements relating to available energy resources into continuous and constant rotary output speed of the driven elements, such as an electrical generator.

It is another object of the present invention to change the mode of the available energy resources in both form and substance for the sake of system simplicity, cost-effectiveness, safety, and ecological conservation in converting minor natural energy.

It is still another object of the present invention to provide for a hybrid energy convertor of universal applicability in using aerodynamic, hydrodynamic, or thermodynamic energy resources, or any combination thereof, as applied with hybrid energy installations.

It is yet another object of the present invention to provide for reliability in the regulation and distribution of electrical energy in case of temporary shortage or loss of major energy supply.

These and other objects of the present invention are achieved by providing a transmission having: a first arrangement for translating a first kinetic energy of a variable velocity into a potential energy of a predetermined height; and a second arrangement responsive to the first arrangement for translating the potential energy into a second kinetic energy of a constant velocity which is a function of the height of the potential energy and independent of the velocity of the first kinetic energy.

More specifically, the first arrangement is contemplated as including a rotary engine operably connected to an elevator, which by actuation by the rotary engine, lifts a mass, which may be compact or loose material, to the predetermined height forming the potential energy.

According to a first preferred embodiment of the present invention, the elevator is in the form of an endless conveyor including a pair of pulleys disposed in substantially vertical orientation, with the lower of the pulleys being connected to the rotary engine for rotation thereby. An endless flexible element is arranged over the pulleys for orbital movement by the lower of the pulleys, and at least one receptacle is mounted on the flexible element for movement therewith, and is arranged for sequentially receiving a mass to be elevated and discharging the mass when reaching the aforementioned predetermined height, which height is associated with the upper pulley of the conveyor.

According to a second preferred embodiment of the invention, the elevator is formed by a rotatably mounted, rigid wheel provided with at least one pocket arranged for receiving the mass to be elevated. This wheel is rotated by the rotary engine in a suitable manner, so as to receive the mass in a pocket thereof when same is at the lowest circumferential position of the wheel, the latter being disposed for rotation about a substantially horizontal axis, and then lifts the mass to the highest circumferential position of the wheel and dumps the mass at that point into structure forming the second arrangement of the device.

The second arrangement of the two arrangements which form a transmission according to the invention preferably includes a substantially vertically disposed guide path arranged adjacent the elevator for receiving the mass therefrom and guiding the mass downwardly toward a rotor, such as a turbine, disposed beneath the guide path for being actuated by the mass, thus converting translatory motion of the mass into rotary motion which can be employed to turn an electrical generator, and the like. Preferably, the second arrangement includes a chute forming the guide path and having an inlet and an outlet, with the inlet being disposed adjacent a discharge of the elevator and the outlet being disposed above and adjacent the rotor which is to be actuated by the falling mass.

The second arrangement also advantageously further includes a transfer device for moving a mass from the rotor to the elevator for being lifted by the elevator and again dropped down the chute. In this manner, the material employed as the mass can be repeatedly recycled through the system.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
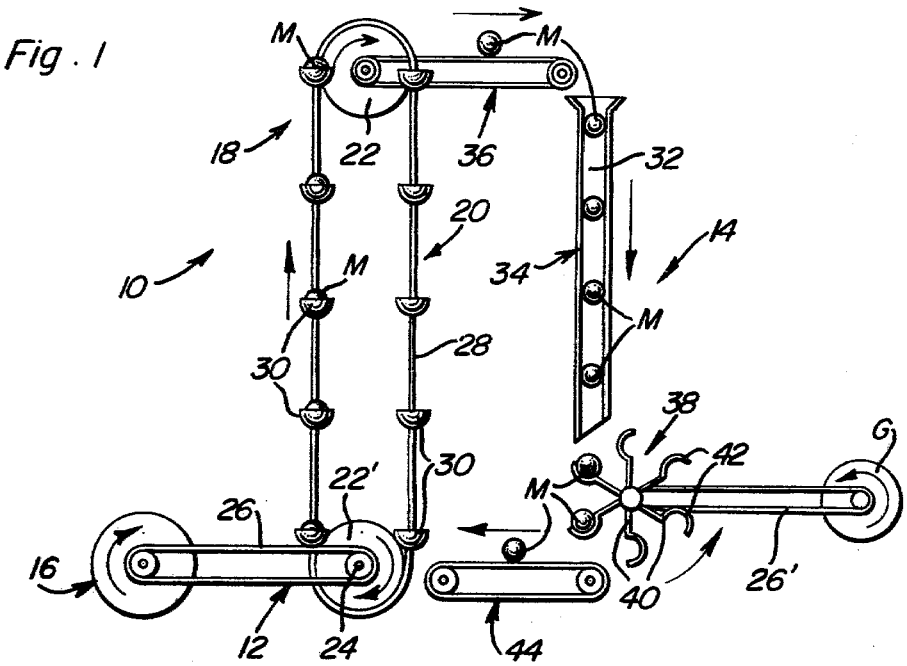
FIG. 1 is a schematic, side elevational view showing a first preferred embodiment of a hybrid energy converter according to the present invention.

Referring now more particularly to FIG. 1 of the drawings, a hybrid energy transmission 10 according to the present invention has a first arrangement 12 disposed for translating a first kinetic energy of a variable velocity, such as that obtained from naturally occurring hydrodynamic, aerodynamic, and thermodynamic sources, into a potential energy of predetermined height, and a second arrangement 14 responsive to arrangement 12 for translating the potential energy into a second kinetic energy of a constant velocity which is a function of the height of the potential energy and independent of the velocity of the first kinetic energy.

First arrangement 12 includes a primary engine 16 of generally conventional construction, such as a waterwheel, windmill, and the like, having connected thereto an elevator 18 which is actuated by engine 16 so as to lift masses M, illustrated as solid balls, to the aforementioned predetermined height representing the potential energy of the system.

Elevator 18 comprises an endless conveyor 20 including a pair of pulleys 22 and 22' disposed in substantially vertical orientation one above the other, with the lower pulley 22' being connected to engine 16 as by a hub 24 of pulley 22' receiving an endless belt 26 associated with an output shaft of engine 16. An endless flexible element 28 is arranged over pulleys 22, 22' for orbital movement by rotation of the lower pulley 22', with a plurality of cup-shaped receptacles 30 being mounted on flexible element 28 for movement therewith and arranged for sequentially receiving a mass M to be elevated.

Second arrangement 14 includes a substantially vertically disposed guide path 32 arranged adjacent elevator 18 for receiving the masses M therefrom and guiding the masses M downwardly. More specifically, guide path 32 is formed by a chute 34 having an inlet and an outlet, with the inlet of chute 34 being disposed adjacent a discharge station of elevator 18 for receiving the balls or other material forming masses M therefrom. In transmission 10, an endless belt conveyor 36 of conventional construction is disposed with one head pulley thereof being arranged concentrically with the shaft of pulley 22 of conveyor 20 for receiving the balls as they are discharged from the receptacles 30 due to mechanically tilting by a conventional dog and pin mechanism (not shown) the latter over the top of pulley 22, and to transfer the balls to the inlet of chute 34. A rotor 38 is disposed beneath guide path 32, or directly below the outlet of chute 34, for being actuated by the balls forming masses M, and converting the translatory motion of the masses M into a rotary motion. Rotor 38 includes a plurality of radially extending arms 40 connected to a common shaft and terminating in a cup 42 configured for receiving one of the balls forming the mass M. The shaft of rotor 38 forms one pulley for a drive belt 26' which is operably connected to a conventional electrical generator G for actuation of generator G in a known manner.

Second arrangement 14 advantageously further includes a transfer conveyor 44 arranged for moving each ball, or mass M, from the cups 42 of rotor 38, as same are dropped therefrom due to downward movement of the cup 42 so that the associated arm 40 is in a substantially vertical plane, to the empty receptacles 30 of elevator 18 for being lifted by elevator 18 upwardly for discharge onto the conveyor 36.

Figure 2:
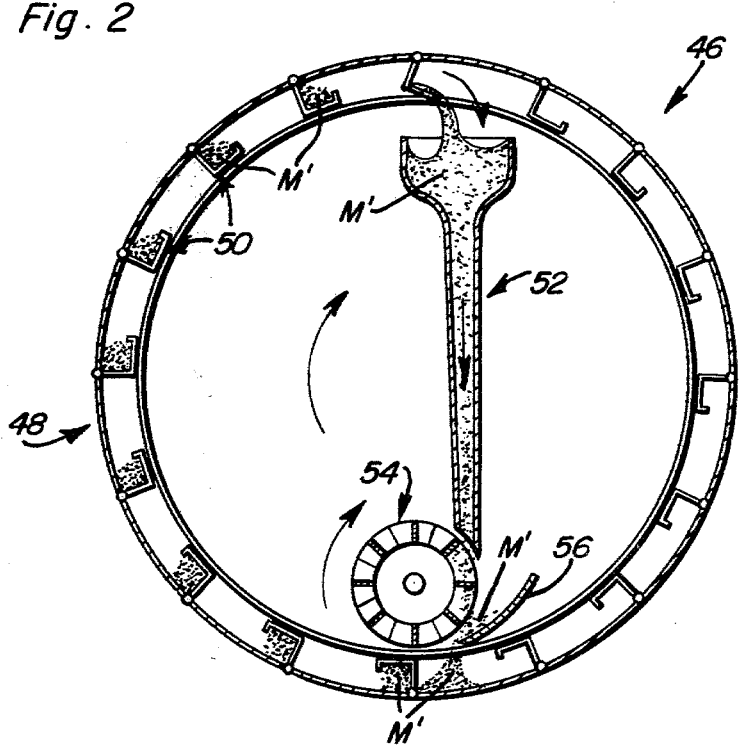
FIG. 2 is a schematic, longitudinal, vertical sectional view, showing a second preferred embodiment of a hybrid energy converter according to the present invention.

Referring now more particularly to FIG. 2 of the drawings, a transmission 46 according to the invention includes a first arrangement wherein the elevator comprises an endless conveyor in the form of a rotatably mounted, rigid wheel 48 having a circumferential rim portion provided with a plurality of barriers 50 forming pockets arranged for receiving a mass to be elevated. In particular, transmission 46 contemplates using a particulate, or bulk, material as the mass M' which is elevated by wheel 48 as same is rotated about a substantially horizontal axis by a, for example, rotary engine which is not shown, but can be similar to engine 16. The second arrangement of transmission 46 includes a chute 52 arranged for forming the requisite guide path leading to a rotor 54 that can be connected in a suitable manner to a power-producing machine (not shown) that can be similar to generator G, and the like. A baffle 56 in the form of an arcuate plate is arranged adjacent rotor 54, which is mounted for rotation about an axis parallel to wheel 48 and includes a plurality of compartments receiving the masses M', such that the latter discharged from rotor 54 will be deflected downwardly into the pockets formed by barriers 50, which barriers open inwardly toward the axis of rotation of wheel 48, and cause masses M' to be again elevated upwardly to the uppermost portion of the circumference of wheel 48 where they will be once again discharged into the inlet opening of chute 52.

Figure 3:
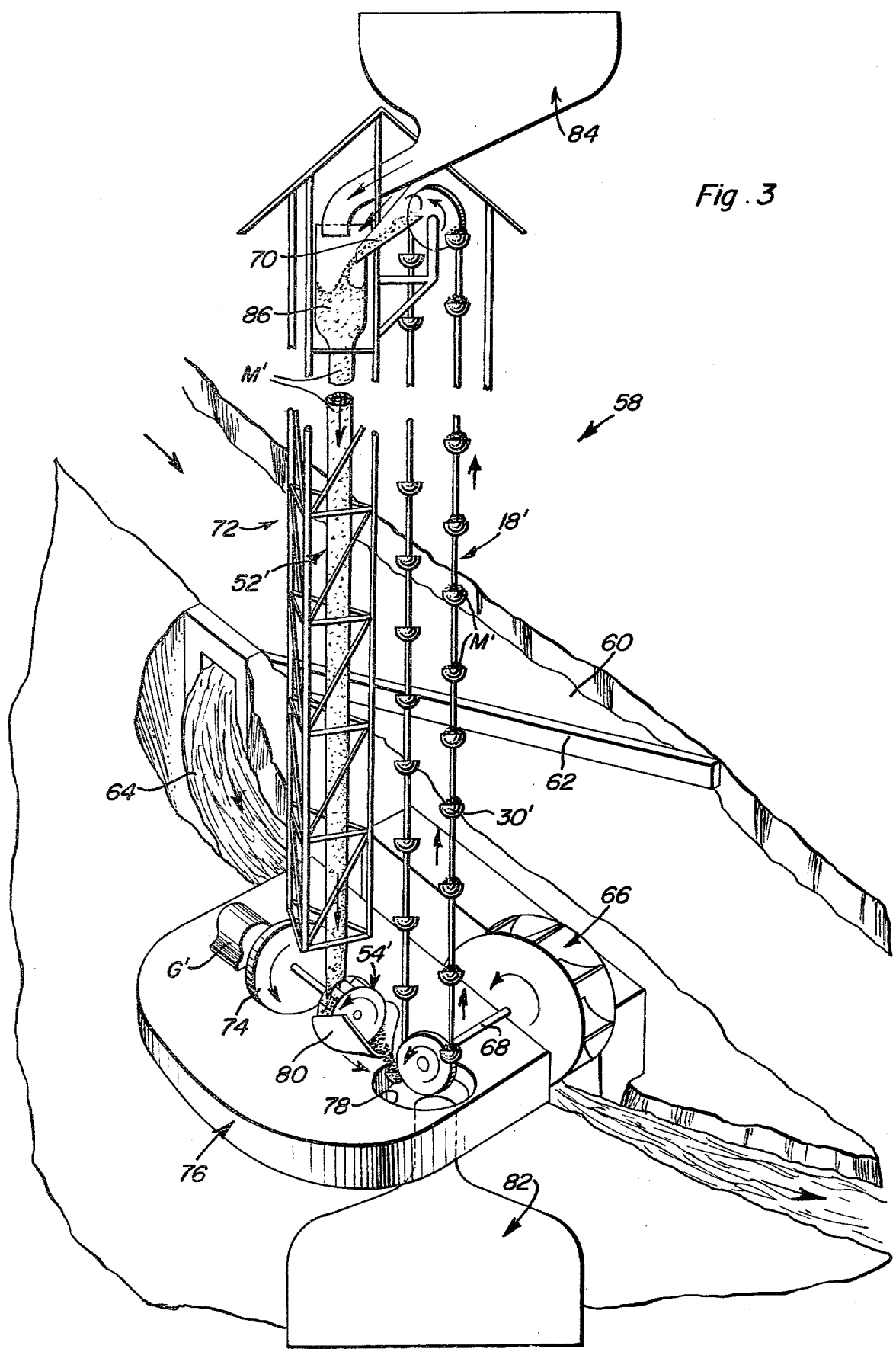
FIG. 3 is a fragmentary, schematic, perspective view showing a hybrid energy converter similar to that seen in FIG. 1, but incorporated into a water operated primary engine.

FIG. 3 discloses an arrangement wherein a transmission according to the present invention is incorporated into a water operated primary engine. In this system, the kinetic energy present by the flow of water in a stream 60 is diverted by means of a diversion dam 62 into a trough 64 so as to operate a conventional undershoot waterwheel 66 having a shaft 68 connected to the lower pulley of an elevator 18' similar to elevator 18. Transmission 58 is illustrated as employing the bulk masses M' as the material being elevated, although it is to be understood that the balls of masses M can also be employed with transmission 58 if desired. Masses M' are elevated to the top of the elevator 18', and are subsequently discharged into a downspout 70 and into a chute 52' arranged within a tower 72 supported in a suitable manner, not shown. The bulk material is permitted to fall downwardly under the influence of gravity through chute 52' so as to act upon a rotor 54' arranged for actuating an electrical generator G'. A flywheel 74 may be inserted on the drive shaft connecting rotor 54' to generator G' so as to compensate for minor energy fluctuations in a known manner and assure that generator G' will be rotated at a constant angular velocity.

Generator G' is mounted on a platform 76, which will generally support the remainder of the elements of the system in a manner not shown in FIG. 3, and this platform 76 is provided with a hole 78 disposed directly beneath the lower pulley of elevator 18'. A tray 80 associated with and disposed directly beneath rotor 54' directs masses M' received from rotor 54' into hole 78 so as to be stored in tank 82 embedded in the ground beneath platform 76 and having an access opening communicating with the hole 78. The system illustrated in FIG. 3 also includes a silo 84 supported at the upper portion of tower 72 for receiving masses M' from tank 82 in a suitable manner, not shown, and holding the masses M' above the enlarged inlet portion 86 of chute 52' for storing energy during periods of low requirements for use during periods of excessive or peak requirements.

More specifically, if the electrical energy drawn from generator G' by, for example, household consumption, exceeds the energy transmitted by the flow of masses M', or balls forming masses M, to rotor 54', the system will shut down and can only be restarted by conventional techniques, not shown, or by modification of the arrangement as described in the following. When all energy transmitted by the stream of masses M' equals the electrical energy drawn by consumption, the material loses all of its velocity and falls smoothly into the tray 80. When, however, the electrical demand is less than the energy of the falling masses M', only part of the velocity of the material is affected, thus subjecting the tray 80 to the impact caused by the remainder of the velocity of the material. This condition may be accounted for either by impact absorbing structure related to tray 80, but not shown, or by regulating the quantity of the free-falling material. The latter case may be accomplished by conventional electric or electronic controls (not shown) controlling operation of the transmission of chute 52' from the enlarged portion 86 to that portion therebelow using iris-type shutters, conical valves, or any other suitable devices, none of which are shown in FIG. 3, to the effect that for the same velocity the flow rate of the granulated material varies with the electrical energy drawn from the generator G'. In that case, the enlarged portion 86 has the capacity to store the total of all of the material involved in the cyclic energy exchange and chute 52' is disposed for controlled flow rate without becoming congested. The same flow rate control mechanism can also serve for restarting the shut-down system. For energy storage beyond the capacity of enlarged portion 86, the large storage silo 84, not shown in detail, is mounted above and around enlarged portion 86 in such a way that the contents by means of suitable control devices (not shown), of silo 84 is made to flow through the outlet spout of silo 84 and into enlarged portion 86 whenever the receptacles 30' of elevator 18' come to a standstill due to insufficient energy input. If that happens, the free-falling contents drawn from the one or more silos 20 are in excess of the volume of material which can be handled by receptacles 30', and accordingly the excess will fall through hole 78 and into the tank 82. Then, when the power situation is reversed, this excess material can be transported from tank 82 back to silo 84 in a suitable manner, not shown, by using an excess of energy output available from the system. This arrangement was discussed herein to exemplify the capability of the invention to be expanded for utilization of any cyclic or arbitrarily fluctuating energy resource, or any combination of energy resources, with the result that the energy consumption of individual users can be met either directly or indirectly by using facilities for energy feedback to and from available electrical grids, and the like.

As can be readily understood from the above description and from the drawings, a hybrid energy transmission according to the invention permits a variable source of naturally occurring energy input to be converted into a steady energy output for beneficial use as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method of energy transmission which changes the energy in both form and substance wherein the output speed is constant regardless of the input speed so long as the input torque is equal to or greater than the output torque, comprising the steps of:
   (a) translating an input kinetic energy of a variable velocity into a potential energy of a predetermined height by raising a plurality of substantially equal masses to said height and channeling the masses directly to a free fall location without providing for storage of the masses;
(b) translating the potential energy into an output kinetic energy of a constant velocity which is a function of the height of the potential energy and independent of the velocity of the input kinetic energy by allowing the masses to free fall through a distance substantially equal to said height under the force of gravity; and
(c) raising the masses after free fall thereof to said height without providing for storage of the masses.

2. A method as set forth in claim 1, wherein the step of translating a first kinetic energy includes the steps of generating a rotary motion and causing the rotary motion to elevate a mass to the predetermined height.

3. A method as set forth in claim 2, wherein the step of translating a second kinetic energy includes the step of transferring the free-fall energy to a rotor for converting translatory motion of the mass into rotary motion of constant angular velocity.

4. A transmission for receiving energy input from a power source of fluctuating velocity and outputting energy to a load of constant velocity in a continuous manner, comprising, in combination:
a plurality of substantially equal masses;
first translation means comprising an elevator means for lifting said masses to a predetermined height;
guide means for guiding said masses in a free fall path;
first transfer means for transferring said masses directly from said first translation means to said guide means;
second translation means for receiving said free falling masses and utilizing the kinetic energy developed thereby for performing work; and
second transfer means for transferring said masses from said second translation means directly to said first translation means for lifting said masses to said predetermined height without providing for storage thereof wherein the input torque to said first translation means is greater than or equal to the output torque of said second translation means.

5. The transmission of claim 4 wherein said first translation means further comprises a rotary engine connected to said elevator means for providing energy to said elevator means for lifting said masses.

6. The structure of claim 5 wherein the elevator means comprises an endless conveyor including a pair of pulleys disposed in vertical orientation one above the other, with the lower of the pulleys being connected to the rotary engine for rotation thereby, an endless flexible element arranged over the pulleys for orbital movement by the lower of the pulleys, and at least one receptacle mounted on the flexible element for movement therewith and arranged for sequentially receiving a mass to be elevated.

7. The transmission of claim 5 wherein said second translation means includes a rotor means disposed beneath the guide means for being actuated by the masses striking thereagainst and thereby converting translatory motion of the masses into rotary motion.

* * * * *